United States Patent [19]

Brown, Jr.

[11] 4,192,573
[45] Mar. 11, 1980

[54] VARIABLE POWER ATTENUATOR FOR LIGHT BEAMS

[75] Inventor: Ray B. Brown, Jr., Upper Marlboro, Md.

[73] Assignee: The United States of America as represented by the Secretary of the Navy, Washington, D.C.

[21] Appl. No.: 951,105

[22] Filed: Oct. 13, 1978

Related U.S. Application Data

[63] Continuation-in-part of Ser. No. 768,657, Feb. 14, 1977, abandoned.

[51] Int. Cl.$^2$ ............................................. G02B 17/06
[52] U.S. Cl. ...................................... 350/55; 350/294; 350/319; 350/17
[58] Field of Search ............... 350/294, 299, 289, 266, 350/319, 17, 55, 26; 331/94.5 S, 94.5 K

[56] References Cited

U.S. PATENT DOCUMENTS

| | | | |
|---|---|---|---|
| 1,578,899 | 3/1927 | Lohmann | 350/55 |
| 2,860,557 | 11/1958 | Moore et al. | 350/294 |
| 3,698,794 | 10/1972 | Brown et al. | 350/266 |
| 3,905,675 | 9/1975 | McCracken | 350/55 |
| 3,971,620 | 7/1976 | Everett | 350/26 |

FOREIGN PATENT DOCUMENTS 4744821  1/1972  Japan ........................................ 350/294

Primary Examiner—Jon W. Henry
Attorney, Agent, or Firm—R. S. Sciascia; Philip Schneider; William C. Daubenspeck

[57] ABSTRACT

An improved variable light beam power attenuator which uses a flat mirror and a focusing mirror fixed in a suitably movable structure. Linear movement of this structure varies the diameter of a spot of light illuminating a "diffraction-limited" aperture of a special shape. A second focusing mirror is provided to collect the "diffraction-limited" light transmitted by the aperture and to focus or collimate it. A second flat mirror may be used to re-direct the output beam. The mounting arrangement of the first two mirrors relative to the input light beam and the remainder of the power attenuator permit an all mirror system which requires only a single linear motion to change the power level of the transmitted beam. The use of an all-mirror system allows all the advantages of reflective optics over transmitting optics for high power CW (continuous wave) laser beam.

8 Claims, 5 Drawing Figures

VARIABLE POWER ATTENUATOR FOR LIGHT BEAMS

BACKGROUND OF THE INVENTION

This is a continuation-in-part of application Ser. No. 768,657, filed 14 Feb. 1977 now abandoned.

This invention relates to light beam attenuators and, as more specifically described hereafter, to variable, high-power, laser-beam attenuators.

This invention is applicable to the attenuation of all types of ligh capable of being reflected by mirrors, but is particularly useful with lasers. Thus, the discussions herein will pertain to its applications thereto.

In systems employing lasers as high intensity coherent ligh beam sources, it is frequently desirable to provide a variable ligh beam attenuator to control the intensity of the beam without appreciably affecting its other properties. Variable apertures or irises frequently used to regulate the intensity of incoherent ligh beam, can, in principle, be used to regulate the cross-section of a coherent beam and hence its total energy content. However, an aperture does not, apart from diffraction effects, change the intensity of the beam portion which passes through it. In many systems, the diffraction of the coherent beam at an aperture is an undesirable effect. One alternative to the use of apertures or irises as light beam regulators is the use of optical density filters. Variable optical density has been provided in the past by employing movable optical wedges or density filters in which optical density is a varying function of position over the area of the filter. Thus, a single circular optical wedge has been used in which optical density is a function of the angle of rotation. Although circular wedges provide a longer span over which to extend the transition from zero to full transmission than does a linear wedge of a length similar to the diameter of the circular wedge, a wedge with a given length of scale may still be inconveniently large. Optical plates of the quality required in laser systems are costly and difficult to obtain in larger sizes. In addition, there are further disadvantages as explained below.

An alternative method is that shown in Applicant's prior patent for a Laser Output Attenuator, U.S. Pat. No. 3,698,797. Both the present invention and the Laser Output Attenuator act like on-axis devices. This is desirable because only a single linear motion is required in operation. However, presently available lenses which work at 10.6μ meters are undesirable because, unlike a mirror, power must pass through them. When power passes through a lens some is absorbed by the lens material, some is absorbed by the anit-reflection coatings, some is scattered by imperfections in the lens and coatings, and some is lost in reflection that cannot be completely eliminated. The power which is absorbed by the lens can cause unwanted distortion and steering of the beam passing through, even when the lens is force cooled. These effects reduce the useful maximum power that can be transmitted reduce the uniformity or quality of the beam, and cause the direction of the beam to change.

An additional problem arises with the use of lens-type power attenuators in high-power applications especially continuous wave (CW) applications. Where high-power lasers are used, (typically greater than 1 kw), lenses absorb energy from the laser beam, causing additional distortion to the light beam passing through. Also, where infra-red light is utilized, lenses become distorted because of nonuniform absorption of light, causing the focal length to change and producing erratic operation of the attenuator. With many lens materials, when the beam intensity reaches a critical value, the absorption coefficient begins increasing rapidly and the lens is destroyed.

The present invention, through the use of mirrors, totally eliminates these problems of the prior art, by eliminating the need for the light energy to pass through any material media whatsoever, except air. All prior-art systems which use mirrors utilize an off-axis system. This severely limits the use of mirrors in laser-power attenuators since when the input beam is moved, one can lose the output beam entirely. The present invention overcomes this problem through the use of a movable structure upon which two mirrors are mounted. This allows the use of mirrors in an off-axis system which operates like an on-axis system similar to that utilized with lenses, but without the attendant difficulties inherent with lenses. Such a system is also less costly and easier to construct than prior-art devices.

SUMMARY OF THE INVENTION

A compact, variable, light beam power attenuator which uses suitable mirrors mounted in a servo-controlled structure to control the intensity of light striking a reflective plate which contains a diffraction-limited apertures. Additional mirrors are used to re-collimate the output light beam and direct it on the optical axis. The system utlizes off-axis mirrors but operates as if it were an on-axis system. Thus, the invention will operate at all levels of light beam power, including high-power lasers, and at all frequencies of light capable of being reflected by mirrors. Attenuation of the incoming light is obtained without causing degradation of the coherence and polarization properties of the light beam, and without causing unwanted steering of the output beam direction. In fact the use of a diffraction-limited pinhole improves beam quality due to the spacial filtering effect.

OBJECTS OF THE INVENTION

An object of the present invention is to control the output power level of a laser without disturbing the laser either by degrading the beam quality, changing the polarization, or producing any unwanted steering of the output beam.

A further object is to control the output level of a laser in a rapid manner so that the variable attenuator can be servo-controlled to eliminate unwanted fluctuations or drifts in laser or subsequent power amplifiers.

Another object is to provide a variable input to a laser power amplifier so that the output varies in a prescribed manner,such as a linear ramp or step.

Still another object is to control the output level of low-to-high-power lasers at nominal cost.

BRIEF DESCRIPTION OF THE DRAWINGS

Other objects and many of the attenant advantages of the present invention will be readily apparent as the invention becomes better understood by reference to the following detailed description with appended claims, when considered in conjunction with the accompanying drawings, wherein:

DESCRIPTION OF THE PREFERRED EMBODIMENT

Figure 1:
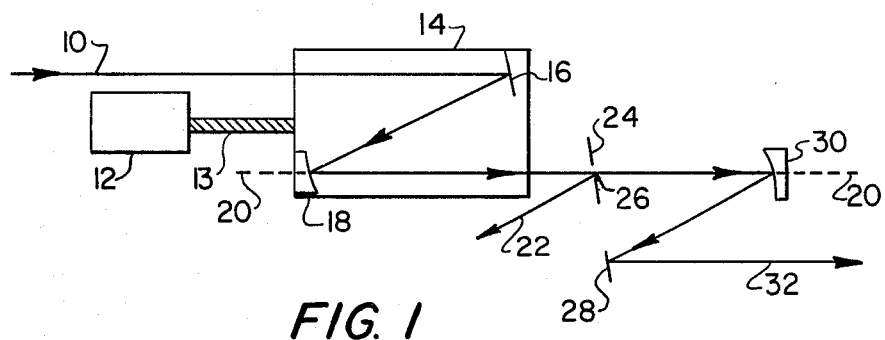
FIG. 1 is a pictorial view of the laser variable power attenuator.

FIG. 1 shows an input laser beam 10 striking a first flat mirror 16 and being reflected to strike a first focusing mirror 18. Both mirrors are mounted in fixed positions on any suitable structure 14 such that the output beam from focusing mirror 18 is offset from and parallel to the input beam 10. The input laser beam 10 after reflection is transmitted from first focusing mirror 18 along optical axis 20 toward diffraction-limited aperture (pinhole) 26 in the center of reflective plate 24. A portion of the light beam transmitted by first focusing mirror 18 is rejected by said reflective plate 24 as rejected light beam 22. The remainder of the light beam striking said pinhole is transmitted through said pinhole to strike second focusing mirror 30. Said second focusing mirror is fixed at such a point that said pinhole 26 is at the focal point of said mirror. Second focusing mirror 30 transmits the light beam it receives to second flat mirror 28. Second focusing mirror 30 and said flat mirror may be included in such a manner as to cause output laser beam 32 to be offset from input laser beam 10.

Motor 12 is connected by connecting means 13 to structure 14 in such a manner as to cause said structure to move along optical axis 20.

Figure 2:
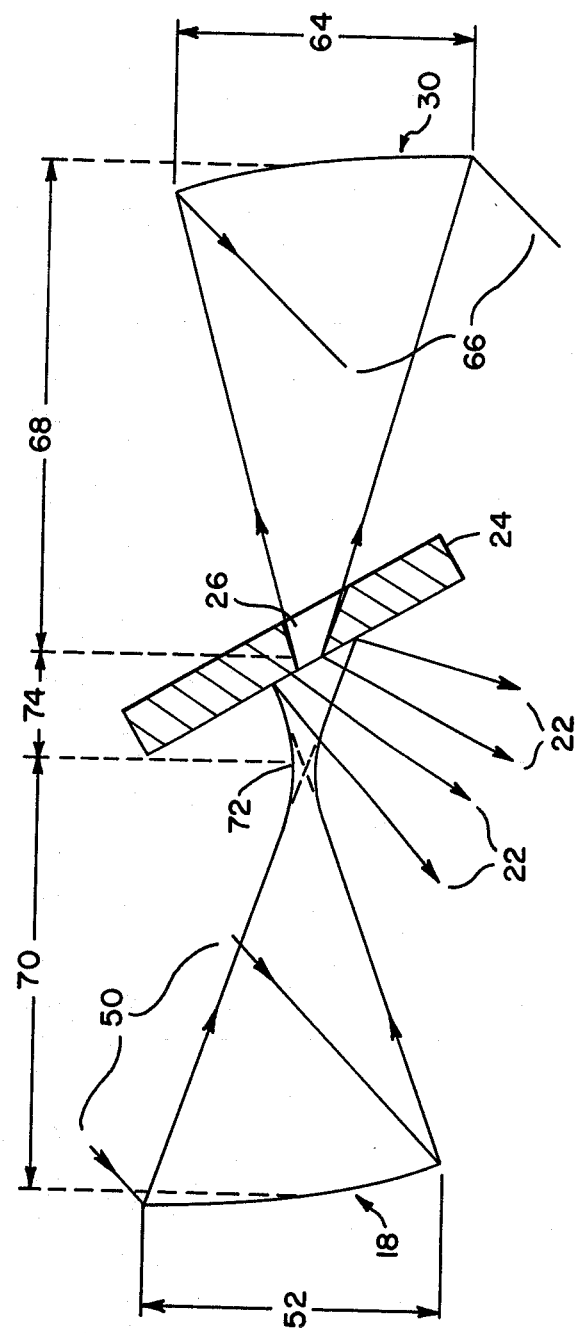
FIG. 2 is a pictorial diagram illustrating the basic principle of operation of the attenuator.

FIG. 2 shows an input light beam 50 striking a focusing mirror 18 with diameter 52. Input light is focused by focusing mirror 18 and strikes reflective plate 24, centered on pinhole 26. The pinhole 26 has a conical bore and has its axis coincident with optical axes of mirrors 18 and 30. The diameter of the input side is chosen so that the pinhole acts as a diffraction-limited point source, as will be explained more fully hereinafter. It is noted that the relative size of pinhole 26 is greatly exaggerated in FIG. 2. Some rejected light 22 does not strike pinhole 26 and is reflected away. The remainder of the input light beam 50 passes through pinhold 26 and strikes mirror 30 which is of diameter 64. Output light beam 66 is transmitted by mirror 30. Reflective plate 24 is located between focusing mirror 18 and mirror 30, normally a focal length away from mirror 30. Focusing mirror 18 is located a focal length 70 plus (or minus) a variable distance 74 from metal plate 24.

Figure 3:
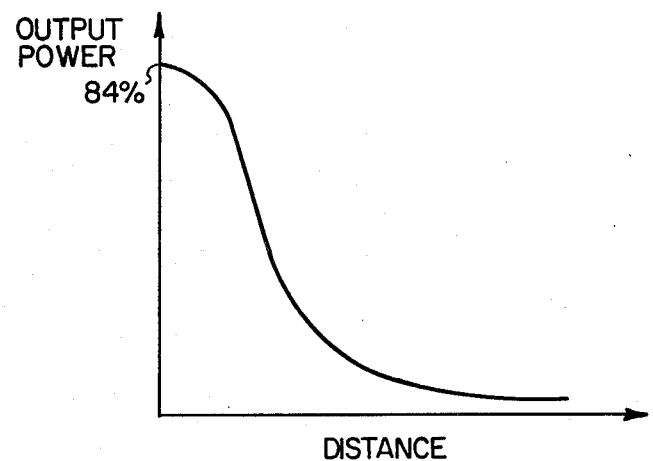
FIG. 3 is a graph illustrating output beam power as a function of distance between focal point and aperture.

FIG. 3 shows the non-linear relation between variable distance 74 and the power in output light beam 66 when input light beam 50 is of uniform intensity.

Figure 4:
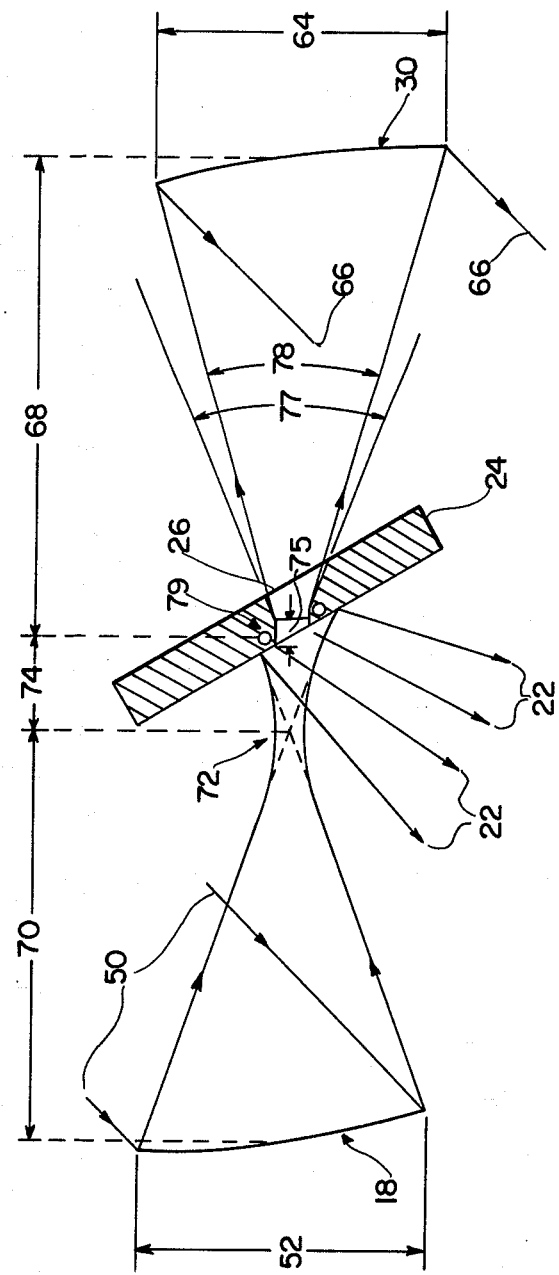
FIGS. 4 and 5 are pictorial views illustrating alternative versions of the reflective plate and the diffraction-limited aperture utilized in the present attenuator.
Figure 5:
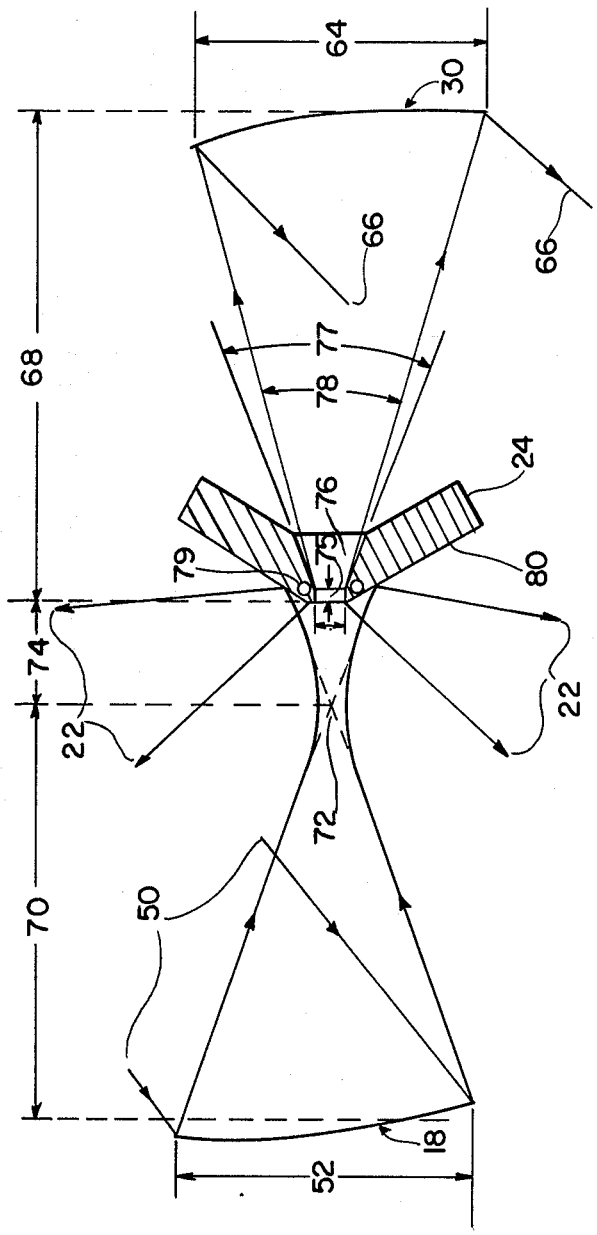

FIG. 4 and FIG. 5 illustrate alternate versions of the pinhole assembly (the reflective plate 24 and the diffraction-limited aperture 26) which may be advantageous to some application, particularly applications involving high power CW lasers. Referring to FIG. 4, the pinhole 26 is formed in the plate 24 in two sections: a circular bore of maximum length 75 and a conical bore 76 whose length is not important. The total angle 77 of the conical bore, however, is restricted to be greater than the total angle 78 of the output beam 66. Length 75 is restricted to be less than the wavelength of the ligh being attenuated but not so small that the pinhole edge will melt due to absorbed energy. Water cooling passages 79 will sometimes be required in plate 58 to prevent damage to the pinhole edge. The front surface of plate 58 is polished and made highly reflective to minimize absorption of the rejected light 22. The material used in plate 24 will depend on many design parameters, including maximum power to be attenuated, ratio of diameter 52 to focal length 70 of mirror 54, wavelength of light being attenuated, quality (uniformity of wavefront) of the light, and maximum angle of tilt of plate 58 that can be tolerated. For some applications it will be advantageous to use a water cooled metal construction and for others a high temperature ceramic, with or without forced cooling.

FIG. 5 shows a pinhole assembly combining an axially symmetric pinhole with a conical or curved reflecting surface 80 which may be advantageous in certain applications. All the considerations previously noted with respect to the pinhole assembly of FIG. 4 are equally applicable here. Note that the light striking above the pinhole 26 is reflected in a different direction from that striking below the pinhole because of the conical reflecting surface 80.

In operation, the theoretical basis of the present invention will be discussed first. Focusing mirror 18 is mounted on a carrier in such a manner as to provide for movement along optical axis 20. This movement causes the intensity of the light beam falling on or about pinhole 26 to change. Mirror 30 is fixed a distance 68 away from pinhole 26, which distance for collimated operation corresponds to the focal length $f_2$ of mirror 30. Normally the f number (ratio of the focal length to diameter) of focusing mirror 18 matches that of mirror 30 and pinhole 26 acts as a diffraction-limited point source for mirror 30. Thus, the only requirement for diameters and focal lengths is determined by the following formula:

$$d_1/f_1 = d_2/f_2$$

where
$d_1$ is distance 52;
$d_2$ is distance 64;
$f_1$ is focal length 70; and
$f_2$ is focal length 68.

Referring to FIG. 2, the diameter of pinhole 26, $d_p$, is just large enough to pass the zero spatial frequency or "DC" component at focus. Thus, assuming complete uniform filling of the mirrors, $d_p$ should be chosen to be:

$$d_p = 2.44\lambda(L/a),$$

where
$\lambda$ = wavelength of the laser beam being attenuated,
L = focal length 70 of the focusing mirror, and
a = diameter 52 of the mirror 18.

This is the diameter of the zero spatial frequency component of "Airy disc," through which 84% of the power in a "perfect" beam passes and is typically on the order of 1 to 10 micrometers for laser radiation. When focusing mirror 18 is positioned such that the beam waist 72 falls on the pinhole, transmission through the pinhole is 84%. As the variable distance 74 between focusing mirror 18 and pinhole 26 is increased, a smaller fraction of the power falls on the pinhole and a greater fraction is rejected. The system thus acts as an on-axis attenuator.

Due to the problems associated with lenses and high power light beams in an off-axis mirror system, as explained heretofore, the present invention was developed. Besides permitting much higher power operation without distortion than a lens device, this invention retains the simple linear motion feature and all other features of on-axis lens devices such as the previously referenced patent by Brown et al. Thus, this device lends itself to simple servo control by means of motor 12, screw 13, and moving platform 14. This motor/screw system drives the structure in the direction of the optical axis. Thus, the flat mirror makes it possible for the structure to move always keep the input laser beam centered on the focusing mirror and parallel to the beam from the laser.

The servo-control feature allows the output of the attenuator to be varied in a prescribed manner, remain steady in spite of fluctuating inputs, and maintain steady power at a point remote from the attenuator even though there are various disturbances in the intervening optical path. The speed of detecting fluctuations and the response time of the servo-system are functions solely of whatever servo-system is utilized and constitute the only limitations to obtaining a steady power output from the attenuation system comprising the present invention.

The type of focusing mirror that may be used will depend on optical considerations of the specific application. For example, if the input light or output light is required to be collimated (with parallel rays), paraboloidal mirrors may be used as appropriate. If uncollimated operation is desired, or other optical considerations demand it, spherical or aspherical mirrors may be used.

Obviously many modifications and variations of the present invention are possible in light of the above teachings. It is therefore to be understood that within the scope of the appended claims the invention may be practiced otherwise than as is specifically described.

What is claimed and desired to be secured by Letters Patent of the United States is:

1. An attenuator for attenuation of an input beam of light comprising:
    a first flat mirror for reflecting the input beam of light;
    a first focusing mirror for receiving the beam of light reflected from said first flat mirror, said first focusing mirror being fixed relative to said first flat mirror so that the axis of the beam of light reflected by the first focusing mirror is offset from and parallel to the axis of the input beam of light;
    a pinhole assembly for receiving the beam of light reflected from said first focusing mirror, said pinhole assembly including a pinhole positioned on the axis of the beam of light reflected by said first focusing mirror; and
    means for moving said first flat mirror and said first focusing mirror in unison relative to said pinhole assembly in a direction parallel to the axis of the input beam of light, said parallel movement of said mirrors acting to vary the proportion of the input beam of light that passes through said pinhole.

2. An attenuator as recited in claim 1 wherein said pinhole assembly comprises:
    a plate having a reflective surface facing said first focusing mirror and a pinhole positioned on the axis of the beam of light reflected by said first focusing mirror.

3. An attenuator as recited in claim 2 wherein said pinhole in said pinhole assembly is of circular cross section and flares conically from the input side facing the first focusing mirror to the output side forming a conically shaped passage.

4. An attenuator as recited in claim 2 wherein said pinhole in said pinhole assembly comprises:
    a first bore of circular cross section; and
    a second bore of conical cross section.

5. An attenuator as recited in claim 2, claim 3, or claim 4 wherein the reflecting surface of said plate is tilted relative to the axis of the beam of light reflected by said first focusing mirror.

6. The attenuator of claim 3 or claim 4 wherein the input beam of light is of a single frequency and wherein the diameter $d_p$ on the input side of said pinhole is determined by the formula $d_p = 2.44\lambda L/a$ where $\lambda$ is the wavelength of the beam of light being attenuated, L is the focal length of the first focusing mirror, and a is the diameter of the first focusing mirror.

7. An attenuator as recited in claim 1 further comprising:
    a second focusing mirror for receiving the portion of said light beam passing through said pinhole.

8. An attenuator as recited in claim 7 further comprising:
    a second flat mirror for receiving the beam of light reflected from said second focusing mirror, the orientation of said second flat mirror being chosen to control the direction of the beam of light reflected by said second focusing mirror.

* * * * *